March 9, 1965 G. A. HARRIS 3,172,611

TAPE REELER

Filed Jan. 4, 1962 3 Sheets-Sheet 1

Inventor:
George A. Harris
By: Ray E. Snyder Atty.

Inventor:
George A. Harris
By: Ray E. Snyder Atty.

March 9, 1965 G. A. HARRIS 3,172,611

TAPE REELER

Filed Jan. 4, 1962 3 Sheets-Sheet 3

Inventor:
George A. Harris
By: Ray E. Snyder Atty.

United States Patent Office 3,172,611
Patented Mar. 9, 1965

3,172,611
TAPE REELER
George A. Harris, Malvern, Pa., assignor to Omnitronics, Inc., Philadelphia, Pa., a corporation of Delaware
Filed Jan. 4, 1962, Ser. No. 164,312
6 Claims. (Cl. 242—55.12)

This invention relates to a tape reeling mechanism for storing, feeding and re-reeling tape for a tape recording or reading device.

Conventional tape reelers of the general type herein involved include two storage reels and an electric motor for driving each of the reels. A brake is provided for each of the motors, and the tension of the tape is controlled by means of two dancer arms which are operable to actuate switches for the motors or the brakes. In a forward feed condition, the tape feeds from one of the reels through a recording or reading device and is taken up on the other reel. The tape is driven at the speed required for the reader or recorder and the tension on the tape fed by or taken up by the reels is determined by the dancer arms.

In a rewind condition, it is customary to drive the feed reel in the reverse direction at full speed and permit the other or take-up reel to spin freely. The tension on the tape is the accelerating force for setting the take-up reel and motor into rotation. The inertia of the full take-up reel and stationary motor may cause the tension to break the tape. In addition, the diameter of the tape on the feed reel is generally much smaller initially than on the take-up reel so that the feed reel turns faster than the take-up reel until the two reels are each half full. Beyond the halfway point, the take-up reel spins faster than the feed reel causing an increase in tape tension and increases the possibility of breakage.

The primary object of the present invention is to provide a tape reeler that does not break the tape during rewind condition.

It is another object to provide an improved tape reeler effective to control the tension of the tape during rewind condition as well as during normal forward feed condition.

It is a more particular object to provide an improved tape reeler having two reels, a motor for driving each reel, a dancer arm and electrical switch means for controlling each of the reels, and additional electrical switch means operated by one of the dancer arms for controlling the operation of the opposite reel during rewind condition.

The invention consists of the novel constructions, arrangements, and devices to be hereinafter described and claimed for carrying out the above stated objects and such other objects as will be apparent from the following description of the preferred form of the invention illustrated with reference to the accompanying drawings wherein:

Like characters of reference designate like parts in the several views.

Figure 1:
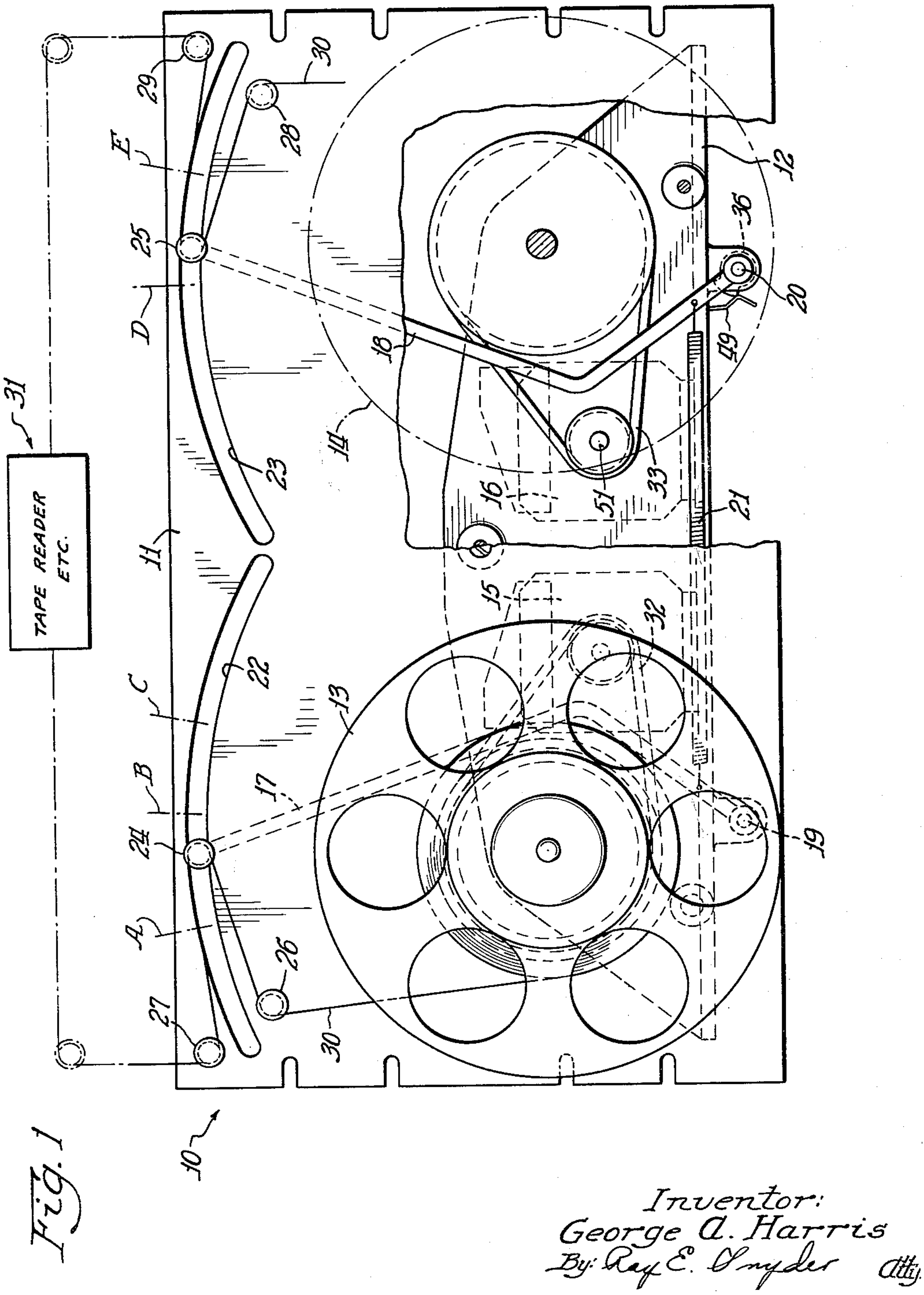
FIG. 1 is a front view partially in section of the tape reeler of the present invention.
Figure 2:
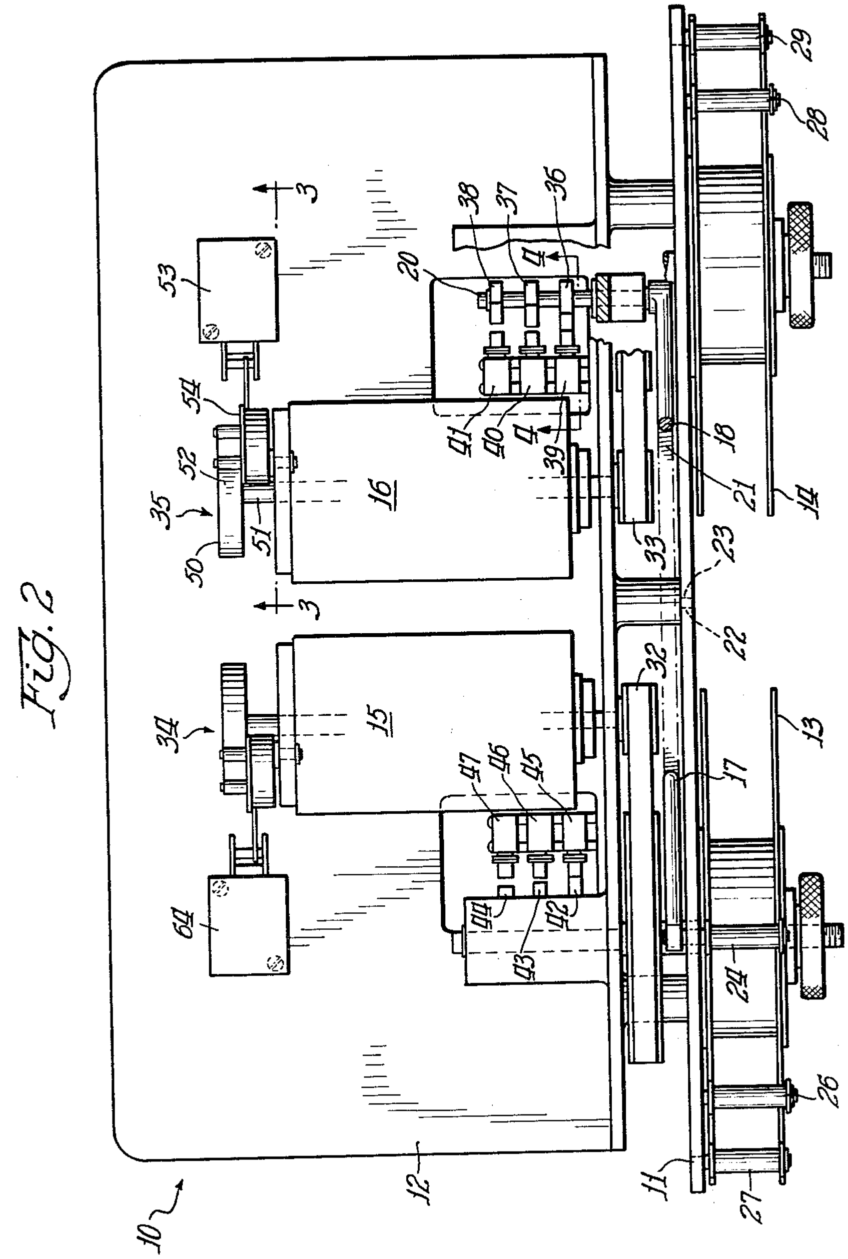
FIG. 2 is a top view partially in section of the reeler of FIG. 1.

Referring to the drawings, the tape reeler of the present invention is designated generally by the numeral 10 and comprises a front mounting panel 11, a supporting chassis 12, a left or take-up reel 13, a right or feed reel 14, a motor 15 for driving the reel 13, a motor 16 for driving the reel 14, a left dancer arm 17, and a right dancer arm 18. The dancer arms 17 and 18 are pivotally mounted on shafts 19 and 20, respectively, and are interconnected by means of a spring 21. The front panel 11 is formed with arcuate elongated slots 22 and 23 through which one end of each of the respective dancer arms extend. The dancer arm 17 carries a spool 24, and the dancer arm 18 carries a spool 25. Additional fixed guide spools 26, 27, 28, and 29 are mounted on the front panel 11. A tape 30 is threaded from the feed reel 14 over the spool 28, the spool 25, the spool 29, through a reading or recording mechanism designated generally by the numeral 31, over the spool 27, the spool 24, and the spool 26 to the take-up reel 13.

The reel 13 is connected to be driven by the motor 15 through a belt 32, and the reel 14 is driven by the motor 16 through a belt 33. However, it is contemplated that the two motors 15 and 16 may be replaced by a single motor with suitable clutch mechanisms for each reel 13 and 14. A brake mechanism 34 is provided for stopping the motor 15, and a brake mechanism 35 is provided for stopping the motor 16. The dancer arm shaft 20 carries a plurality of cams 36, 37, and 38 fixedly mounted thereon and adapted to actuate micro-switches 39, 40, and 41, respectively, mounted on the chassis 12. Similarly, the dancer arm shaft 19 carries cams 42, 43, and 44 fixedly mounted thereon and adapted to actuate micro-switches 45, 46, and 47 also mounted on the chassis 12.

The reeler 10 also includes taut tape switches and out-of-tape switches which are mounted on the back of the front panel 11 but are not physically shown on the figures. Their description is not deemed relevant for an understanding of the present invention.

Figure 4:
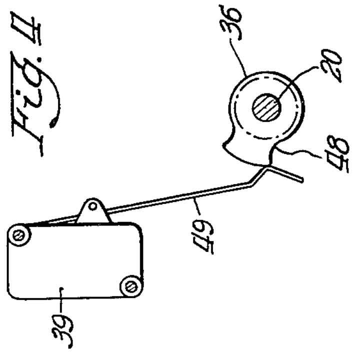
FIG. 4 is an enlarged fragmentary view of a micro-switch and cam structure taken on line 4—4 of FIG. 2.

A typical cam and switch arrangement is shown in FIG. 4 and includes the cam 36 which is formed with a cam surface 48, and micro-switch 39 includes a switch actuating finger or lever 49 which rides in contact with the cam surface 48.

Figure 3:
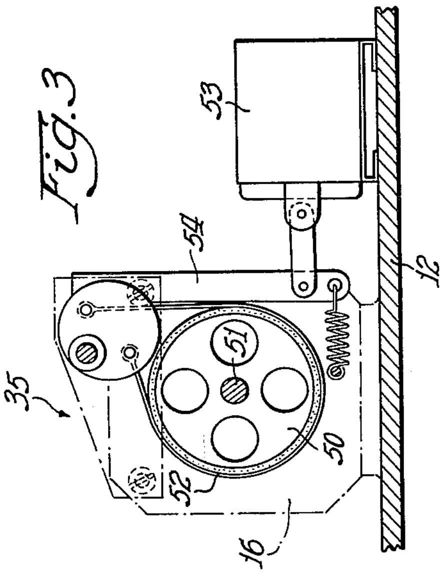
FIG. 3 is an enlarged fragmentary view of a brake mechanism for one of the motors taken on line 3—3 of FIG. 2.

Referring to FIG. 3, the brake mechanism 35 includes a friction drum 50 mounted on a shaft 51 of the motor 16, a flexible brake band 52 engaging approximately three-quarters of the periphery of drum 50, a solenoid 53, and a lever mechanism 54, operated by the solenoid 53 and attached to the band 52. The brake mechanism 35 is actuated by energizing the solenoid 53 which is effective to tighten the band 52 around the drum 50 and stop the motor shaft 51.

Figure 5:
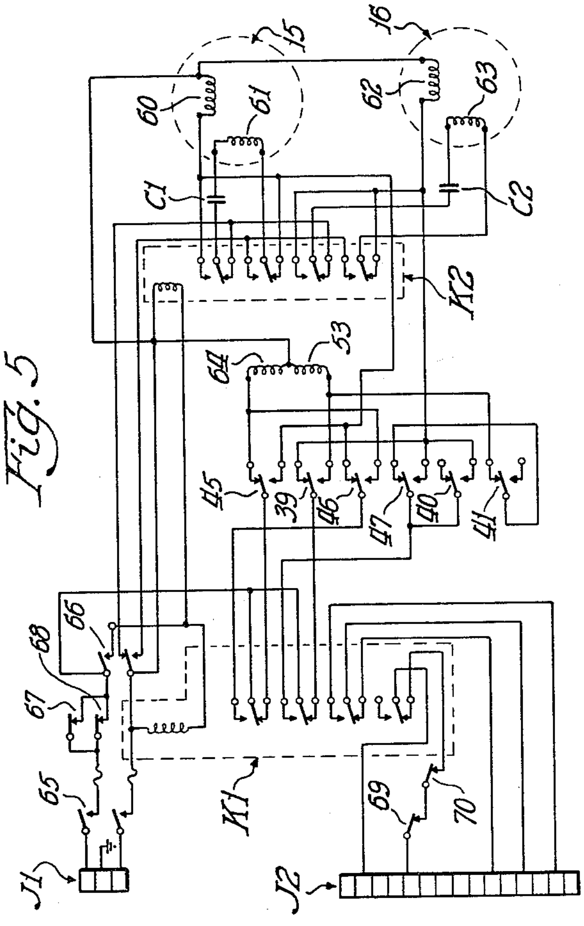
FIG. 5 is a schematic diagram of the electric control circuit for the reeler of FIG. 1.

Referring to FIG. 5, there is illustrated a schematic diagram of the control circuit for the motors 15 and 16 and brakes 34 and 35 for the two motors. The motor 15 includes windings 60 and 61, and the motor 16 includes windings 62 and 63. The circuit of FIG. 5 also includes the winding of solenoid 53 for the right brake 35 and a corresponding winding of solenoid 64 for the left brake 34. A phase shift capacitor C1 is provided for the windings of the motor 15, and a phase shift capacitor C2 is provided for the windings of motor 16.

The circuit of FIG. 5 also includes relays K1 and K2, a power switch 65, a forward-rewind switch 66, broken tape or out-of-tape switches 67 and 68, and taut tape switches 69 and 70, as well as previously identified switches 39, 40, 41, 45, 46, and 47. Power is supplied to the circuit through a connector J1 and signal connections are available from connector J2.

*Operation*

In operation, power is supplied to the control circuit through the connector J1 and power switch 65. When the reeler is properly threaded, switches 67 and 68 are closed, and power is supplied to the forward-rewind switch 66. The switch 66 is in the position illustrated for normal forward drive operation. In this condition, relays K1 and K2 are also deenergized as in the position shown. That is, the upper contact of the switch 66 is open and no current flows to either of the coils of K1 or K2. The switch 45 is operated by the left dancer arm 17, and energizes either the left brake solenoid 64 or the left motor 15.

Referring to FIG. 1, the switch 45 is operated at the center of dancer arm travel corresponding to a control point B on the figure so that half of the arm travel is available to start or stop the motor 15. As the tape 30 advances, excessive slack is produced causing the spring loaded dancer arm 17 to move to the right past the control point B. At this point, the switch 45 is operated starting the motor 15. As the tape 30 is taken up, the dancer arm 17 moves to the left past the switch control position B, disconnecting the power to drive motor 15 and energizing the solenoid 64 for the brake 34.

The dancer arm 18 functions in the same manner to operate the switch 39 to energize the motor 16 or the brake solenoid 53 whenever the dancer arm 18 moves past the control point D, so as to maintain a proper supply of tape from the reel 14.

The reeler is placed in a rewind condition by moving the switch 66 to the rewind position. Moving the switch 66 into this position is effective to energize both of the relays K1 and K2 and causes their contact arms to move to the opposite positions from those shown. The function of relay K2 is to effectively reverse the direction of rotation of the motors and will not be further described. Actuation of the relay K1 is effective to remove switches 45 and 39 from the circuit, and at the same time effectively place switches 46, 47, 40, and 41 in the circuit.

Figure 6:
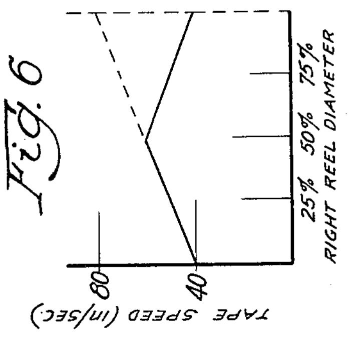
FIG. 6 is a graph of tape speed versus percentage load of one of the reels.

In the rewind mode, except for start-up, the control of both rewind motors 15 and 16 is performed by the left dancer arm 17. In normal rewind operation, the right motor 16 and reel 14 operate at full speed continuously until the tape diameter of reel 14 becomes larger than the diameter of the tape on left reel 13. If the motor 16 is driven at a constant angular velocity after this time, the speed at which the tape is taken up on the reel 14 gradually increases corresponding to the increasing tape diameter on the reel. This increasing tape speed with increasing tape diameter is shown as a broken inclined line on the graph of FIG. 6.

The reel 13 is driven by the motor 15 and is started and stopped during this time so as to maintain a constant supply of tape to the right reel 14. The motor 15 and brake solenoid 64 are controlled by the switch 46 which is now operated by the dancer arm 17. The switch 46 is moved from one position to the other whenever the dancer arm 17 moves past the control point C (as shown on FIG. 1).

When the diameter of the tape on reel 14 equals or exceeds the tape diameter on the reel 13, the drive for reel 13 can no longer keep up with the required supply of tape. The dancer arm 17 is then caused to move to the left corresponding to the loss of available loop in the tape 30. When the dancer arm 17 is moved to the left past the control point A (shown on FIG. 1), switch 47 is actuated by arm 17. Switch 47 is connected in series with switch 41 which is controlled by dancer arm 18. Switch 47 is effective to energize either the brake solenoid 53 or the motor 16. The dancer arm 18 is normally at or near its extreme right position during the rewind condition. Therefore, when the dancer arm 18 is moved past the control point E, switch 41 is closed and when dancer arm 17 is moved to the left past the point A, switch 47 is actuated and solenoid 53 is energized for stopping the right reel 14. In other words, the left dancer arm 17 detects when the tape has moved to a position where there is danger of breaking the tape and is effective to stop the right reel 14. In the last described condition, the left reel 13 and motor 15 will be operating at full speed, and starting and stopping of motor 16 and right reel 14 will be controlled by the dancer arm 17 whenever it moves to the left past the control point A.

For certain other operating conditions, e.g., where the dancer arm 18 is to the left of position D, there is sufficient slack in the tape 30, so that it is unnecessary to stop the motor 16. The switch 40 is closed by the dancer arm 18 when it moves to the left past the control point B to insure that the motor 16 continues to run independently of the condition of switch 47. When the dancer arm 18 moves to the right of position D, the switch 40 is opened and when the arm moves still further to the right past the control point E, the switch 41 is closed and is then in condition to energize the solenoid 53 whenever the switch 47 is closed, as pointed out above; this occurs when the left dancer arm 17 moves to the left past control point A.

Referring again to FIG. 6, the operation above described is illustrated graphically and shows a plot of tape speed as a function of right reel diameter. In a conventional reeler, the tape speed would normally increase linearly past the half-way point as shown by the broken line. In the present embodiment, however, the tape speed is controlled beyond the half-way point so as to prevent overspeeding and thereby prevent tape breakage.

There has been provided by this invention an improved tape reeling mechanism effective to control the speed of operation of the tape reels during rewind condition and thereby prevent breakage of the tape. While the present invention has been illustrated showing electrical switches operated by the respective dancer arms for controlling the motors and brakes, it is contemplated that other drive means for the reels could be employed such as solid state devices and inductive pickups to accomplish the same results without departing from the principles of the invention. In addition, it is contemplated that a single drive motor may be employed for driving both reels with appropriate clutches for each reel.

It is to be understood that the invention is not to be limited to the specific constructions and arrangements shown and described, except only insofar as the claims may be so limited, as it will be understood to those skilled in the art that changes may be made without departing from the principles of the invention.

I claim:

1. In a tape reeling mechanism, the combination of a feed reel and a take-up reel, drive means for driving each of said reels independently, a dancer arm for each reel biased to engage the tape for controlling the drive means for a respective reel, and electrical control means operated by said dancer arms and operable in a rewind condition to start and stop only that one of the two reels which has the larger tape diameter.

2. In a tape reeler, the combination of a feed reel and a take-up reel, a first dancer arm over which the tape is looped for controlling the feed reel, a second dancer arm over which the tape is looped for controlling the take-up reel, drive means interconnected with said reels and operated by the dancer arms for controlling the operation of the respective reels, and electrical switch means operated by both of said dancer arms and sensitive of the amount of tape loop in the rewind condition for controlling the starting and stopping only of the reel having the larger tape diameter.

3. In a material handling system in which drive means and brake means are selectively energized to pass a strand of material from a supply means over a first slack-indicating means positioned adjacent the supply means and over a second slack-indicating means to a take-up means positioned adjacent the second slack-indicating means, a control system for regulating return of the material from the take-up means to the supply means comprising switching means positioned for operation as said second slack-indicating means passes a minimum-slack position adjacent the take-up means, and means including said switching means for actuating the brake means and slowing said supply means responsive to operation of said switching means to insure that excessive tension is not applied to the strand of material.

4. In a material handling system in which drive means and brake means are selectively energized to pass a strand of material from a supply means over first and second slack-indicating means to a take-up means, a control system for regulating return of the material from the take-up means to the supply means comprising first switching means positioned for operation as said first slack-indicating means passes a minimum-slack position, second switching means positioned for operation as said second slack-indicating means passes a minimum-slack position, and means including said first and said second switching means for actuating the brake means and slowing said supply means responsive to the concomitant operation of said first and second switching means to insure that excessive tension is not applied to the strand of material.

5. In a tape reeling system in which drive means and brake means are selectively energized to pass the tape from a first reel over a first dancer arm positioned adjacent the first reel, and over a second dancer arm to a second reel, the second dancer arm being disposed adjacent the second reel, a control system for regulating rewind of the tape from the second reel to the first reel comprising first switching means positioned for actuation as the first dancer arm passes a minimum-slack position, second switching means positioned for actuation as the second dancer arm passes a minimum-slack position, circuit means including said first and second switching means for effecting operation of the brake means and slowing of the first reel during rewind responsive to simultaneous operation of said first and second switching means, and third switching means positioned for actuation by said second dancer arm only when said second switching means is not actuated to regulate the selective driving and braking of said second reel whenever more than the minimum amount of tape is present adjacent said second reel.

6. In a tape reeling system in which drive means and brake means are selectively energized to pass the tape from a first reel over a first dancer arm positioned adjacent the first reel, and over a second dancer arm to a second reel, the second dancer arm being disposed adjacent the second reel, a control system for regulating rewind of the tape from the second reel to the first reel comprising first switching means positioned for actuation as the first dancer arm passes a minimum-slack position, second switching means positioned for actuation as the second dancer arm passes a minimum-slack position, circuit means including said first and second switching means for effecting operation of the brake means and slowing of the first reel during rewind responsive to simultaneous operation of said first and second switching means, and third switching means positioned for actuation by said first dancer arm only when said first switching means is not actuated to regulate the selective driving and braking of said first reel whenever more than the minimum amount of tape is present adjacent said first reel.

References Cited in the file of this patent

UNITED STATES PATENTS

| | | |
|---|---|---|
| 1,964,874 | Fankboner | July 3, 1934 |
| 2,221,543 | Johannessen | Nov. 12, 1940 |
| 2,893,653 | Schultheis et al. | July 7,1959 |